(12) United States Patent
Cantin et al.

(10) Patent No.: US 7,522,289 B2
(45) Date of Patent: Apr. 21, 2009

(54) SYSTEM AND METHOD FOR HEIGHT PROFILE MEASUREMENT OF REFLECTING OBJECTS

(75) Inventors: Michel Cantin, Brossard (CA); Benoît Quirion, Boucherville (CA); Alexandre Nikitine, Montréal (CA)

(73) Assignee: Solvision, Inc., Boucherville, Quebec ( * ) Notice: Subject to any disclaimer, the term of this patent is extended or adjusted under 35 U.S.C. 154(b) by 215 days.

(21) Appl. No.: 10/962,444

(22) Filed: Oct. 13, 2004

(65) Prior Publication Data

US 2006/0077398 A1    Apr. 13, 2006

(51) Int. Cl.
*G01B 9/02* (2006.01)
(52) U.S. Cl. ...................................... 356/512
(58) Field of Classification Search ................. 356/489, 356/495, 511–516, 457, 458
See application file for complete search history.

(56) References Cited

U.S. PATENT DOCUMENTS

| | | | | |
|---|---|---|---|---|
| 6,621,579 B2 * | 9/2003 | Ge | ............................... | 356/512 |
| 6,806,966 B1 * | 10/2004 | Mueller et al. | .............. | 356/514 |
| 7,057,741 B1 * | 6/2006 | Mueller et al. | .............. | 356/512 |

* cited by examiner

*Primary Examiner*—Hwa (Andrew) S Lee

(57) ABSTRACT

The present invention provides an interferometric method and system to measure the height profile of reflecting objects with respect of a reference surface. The method comprises obtaining an image of the object along a specular reflection axis, wherein the image corresponds to an intensity pattern projected on the object along a projection axis, and wherein the specular reflection axis corresponds to a direction along which a portion of the intensity pattern is specularly reflected by the object. Then the method comprises calculating an object phase using the image and determining the height profile using the object phase and a reference phase associated to the reference surface.

39 Claims, 9 Drawing Sheets

SYSTEM AND METHOD FOR HEIGHT PROFILE MEASUREMENT OF REFLECTING OBJECTS

FIELD OF THE INVENTION

The invention relates to measurement systems and methods. More specially, the present invention relates to 3D height measurement, based on Fast Moire Interferometry, of reflecting objects

BACKGROUND OF THE ART

The Fast Moiré Interferometry method (FMI) is based on the combination of structured light projection and a phase-shift method for extracting, from an image of an object, 3D information about the object. FIG. 1 presents an example of a FMI system that enables such method.

As illustrated in FIG. 1, the FMI method is based on detecting light diffused by the inspected object. Structured light is projected on the object along a projection axis that is inclined by an angle θ with respect to the detection axis and diffused light along the detection axis, which is substantially normal to the surface of the object, is measured to provide an image of the object. But, in the case of reflection objects, the structured light projected on the object is in majority reflected along a direction which corresponds to the specular reflection of the projected light (like a mirror), and which does not correspond to the detection axis of FIG. 1. Therefore there is no (or very little) light directed toward the camera, what makes the inspection of such shiny object very difficult.

Thus there is a need for a FMI system and method for the 3D imaging of reflecting objects.

SUMMARY

In one of its aspects, the present invention provides a method and system to measure the height profile of reflecting objects.

The invention provides a method for determining a height profile of an object with respect to a reference surface. The method comprises placing the object on the reference surface and obtaining an image of the object along a specular reflection axis, wherein the image corresponds to an intensity pattern projected on the object along a projection axis, and wherein the specular reflection axis corresponds to a direction along which a portion of the intensity pattern is specularly reflected by the object. Then, the method comprises determining an object phase map using the image and determining the height profile using the object phase map and a predetermined reference phase map corresponding to the reference surface.

The invention further provides a method for determining a height profile of an object with respect to a reference surface, the method comprising optimizing at least one of an orientation of the object, with respect to a projection axis and a detection axis, and an orientation of the detection axis, with respect to the object, to provide an optimized imaging configuration, wherein the optimized imaging configuration corresponds, in the case where a surface of the object is substantially reflecting, to a configuration that provides along the detection axis a specular reflection, by the surface, of at least a portion of the projected intensity pattern and wherein the optimized configuration corresponds, in the case where the surface of the object is substantially diffusing, to a configuration that does not provide along the detection axis a specular reflection by the surface of a portion of the projected intensity pattern. The method also comprises obtaining, at the optimized imaging configuration, an image of the object along the axis, wherein the image corresponds to an intensity pattern projected on the object along the projection axis. The method also comprises calculating an object phase using the image and determining the height profile using the object phase and a reference phase associated to the reference surface.

Advantageously the above methods comprises determining a relief map of the object and further comprises determining a volume of the object from the relief map.

The invention further provides a method for determining a height profile of an object with respect to a reference surface. The method comprises placing the object on the reference surface and obtaining a specular image of the object along a specular reflection axis, wherein the specular image corresponds to an intensity pattern projected on the object along a projection axis, and wherein the specular reflection axis corresponds to a direction along which a portion of the intensity pattern is specularly reflected by the object. The method also comprises obtaining a non-specular image of the object along a detection axis that is oriented differently from the specular reflection axis, wherein the non-specular image corresponds to the intensity pattern projected on the object along the projection axis. The method also comprises determining an object phase map using at least one of a portion of the specular image and a portion of the non-specular image and determining the height profile using the object phase map and a reference phase map corresponding to the reference surface.

Advantageously, calculating the object phase comprises merging the specular and non-specular images in a global image from which the object phase is established. It also comprises establishing a first phase using the specular image and establishing a second phase using the non-specular image and merging the first and second phases to provide the object phase.

The invention further provides a system for determining a height profile of an object. The system comprises a pattern projection assembly for projecting along a projection axis an intensity pattern on the object and a detection assembly for obtaining along a detection axis at least one image of the object, wherein the detection axis corresponds to a direction along which a portion of the intensity pattern is specularly reflected by the object. The system also comprises a processor for establishing a phase map of the object using the at least one image and for determining the height profile of the object using the object phase map and a reference phase map.

Advantageously, the system also comprises an object orienting means for optimizing the object orientation with respect to the projection axis and the detection axis, and comprises a detection axis orienting means for optimizing the detection axis orientation with respect to the projection axis. Also the system comprises a second detection assembly for obtaining along a different axis than the detection axis at least one image of the object. It also comprises displacement means for positioning, at selected positions, the intensity pattern relative to the object.

DESCRIPTION OF THE DRAWINGS

In order that the invention may be readily understood, embodiments are illustrated by way of example in the accompanying drawings.

Further details of the invention and its advantages will be apparent from the detailed description included below.

DETAILED DESCRIPTION

In the following description of the embodiments, reference to the accompanying drawings are by way of illustration of an example by which the invention may be practiced. It will be understood that other embodiments may be made without departing from the scope of the invention disclosed.

In one embodiment of the present invention, the height profile of a substantially reflecting object such as, for example, an object with a reflective metallic coating, is measured using a Fast Moire Interferometry phase stepping method (FMI).

In the FMI method, an image is taken of an object and the 3D information is extracted from this image by evaluating an intensity variation at each point of the image due to the height profile of the object. The height profile information of the object, $h'(x',y')$, as measured along the z'-axis in the corresponding orthogonal coordinates system x'y'z', can be found in the phase map $\phi_{object}(x',y')$ associated with the variation of the image intensity, $I(x',y')$ measured along the z'-axis. A phase-shifting technique with different images taken for different grating projections is used to determine, from the images, the phase map $\phi_{object}(x'y')$ for both the object and for a reference surface $\phi_{ref}(x',y')$. As it is well known in the art, depending on the situation, the phase map may be determined with only two images (meaning that there are only two intensity pattern projections, each pattern projections being phase-shifted from the other) or with more than two images (in this case; more phase-shifted projections of the intensity pattern are needed).

Once the object and reference phase maps have been determined, the height profile of the object relative to the reference surface and along the z'-axis, $h'(x',y')=z'_{object}(x',y')-z'_{ref}(x',y')$, is calculated on the basis of the difference of the phase values, $\delta(x',y')$, for each point of the image:

$$h'(x', y') = \frac{1}{k_{z'}} \cdot \delta(x', y') = \frac{\varphi_{object}(x', y') - \varphi_{ref}(x', y')}{k_{z'}}$$

where $k_{z'}$ represents the spatial frequency of the projected grid in z' direction, which can be determined from the system calibration.

Naturally, as someone skilled in the art will know, the height value $h'(x',y')$ obtained in the coordinate system x'y'z' can be easily converted into the object height $h(x,y)$ along the z-axis (the normal of the object) using known coordinate transformations.

Thus, the FMI method offers the possibility to measure the height profile $h(x,y)$ of an object versus any reference surface. For example, it could be a plane reference, or a similar object without any defects, or else.

Figure 1:
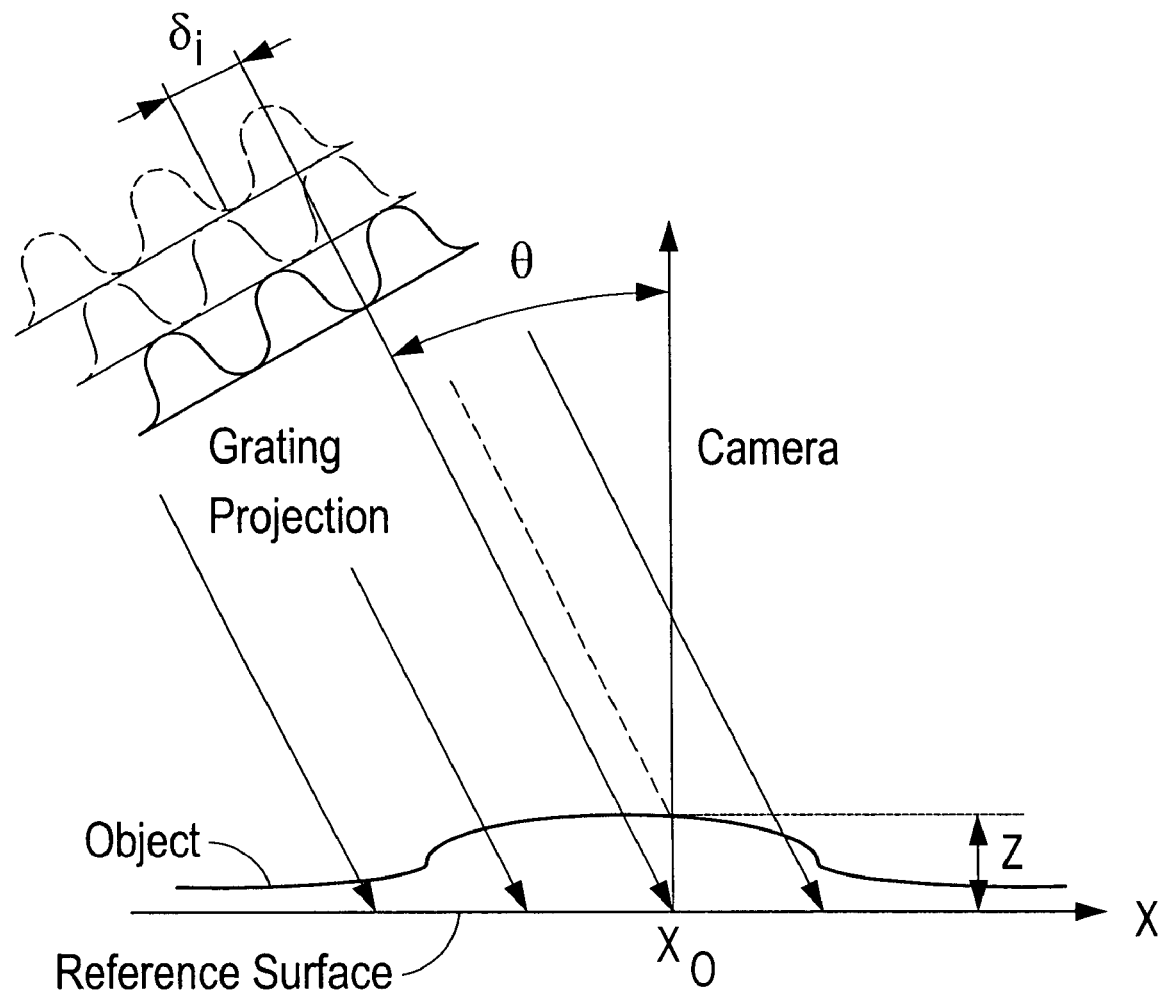
FIG. 1 is a schematic view of a phase-stepping Fast Moiré Interferometry (FMI) system as known in the prior art.
Figure 2A:
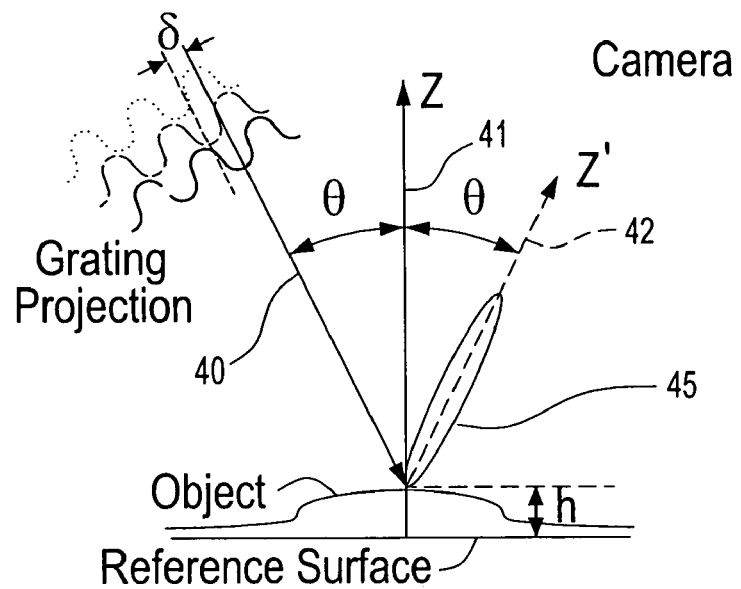
FIG. 2A is a schematic view of a phase stepping FMI system for measuring a height profile of a reflecting object, in accordance with an embodiment of the present invention.

FIG. 2A presents an example of the FMI method applied to measure the height profile of a highly reflecting object such as, for example, an object with a reflective metallic coating. An intensity pattern, such as for example a grating pattern or a sinusoidal pattern, is projected along a projection axis 40 on the reflecting object. The projection axis 40 makes an angle θ with the normal of the surface of the object. A camera measures, along a specular reflection axis 42, which also makes an angle θ with the normal of the surface, an image of the transparent object corresponding to the first projection of the intensity pattern. As can be seen on FIG. 2A, because the surface of the object is mostly reflective, the light scattered by the surface forms a light scattering lobe 45 that is concentrated along the specular reflection axis 42. Therefore most of the light scattered by the reflective object can be detected by the camera with this method.

Then, the projection of the intensity pattern on the reflecting object is phase-shifted and another image is taken. This sequence of measurements is repeated until enough images are acquired. From these images, a phase map of the object $\phi_{object}(x',y')$ is calculated and, as mentioned above, when the phase map is compared to a reference phase map, $\phi_{ref}(x',y')$, a height profile $h(x,y)$ can be determined.

Although we have described in the above a Fast Moiré Interferometry method based on phase-shifting (or phase-stepping) of an intensity pattern, it will be obvious for someone skilled in the art, that other ways, without departing from the scope of the invention disclosed, can be used to extract, from an image, the phase map information, such as for example to use of Fast Fourier Transform to determine the phase map of the transparent object. In that case only one image of the object is necessary to determine the object phase. The present invention comprises all techniques by which the height information of a reflecting object can be extracted from one or more images, the images being characterizing the object on which is projected a structured intensity (intensity patterns).

Figure 3:
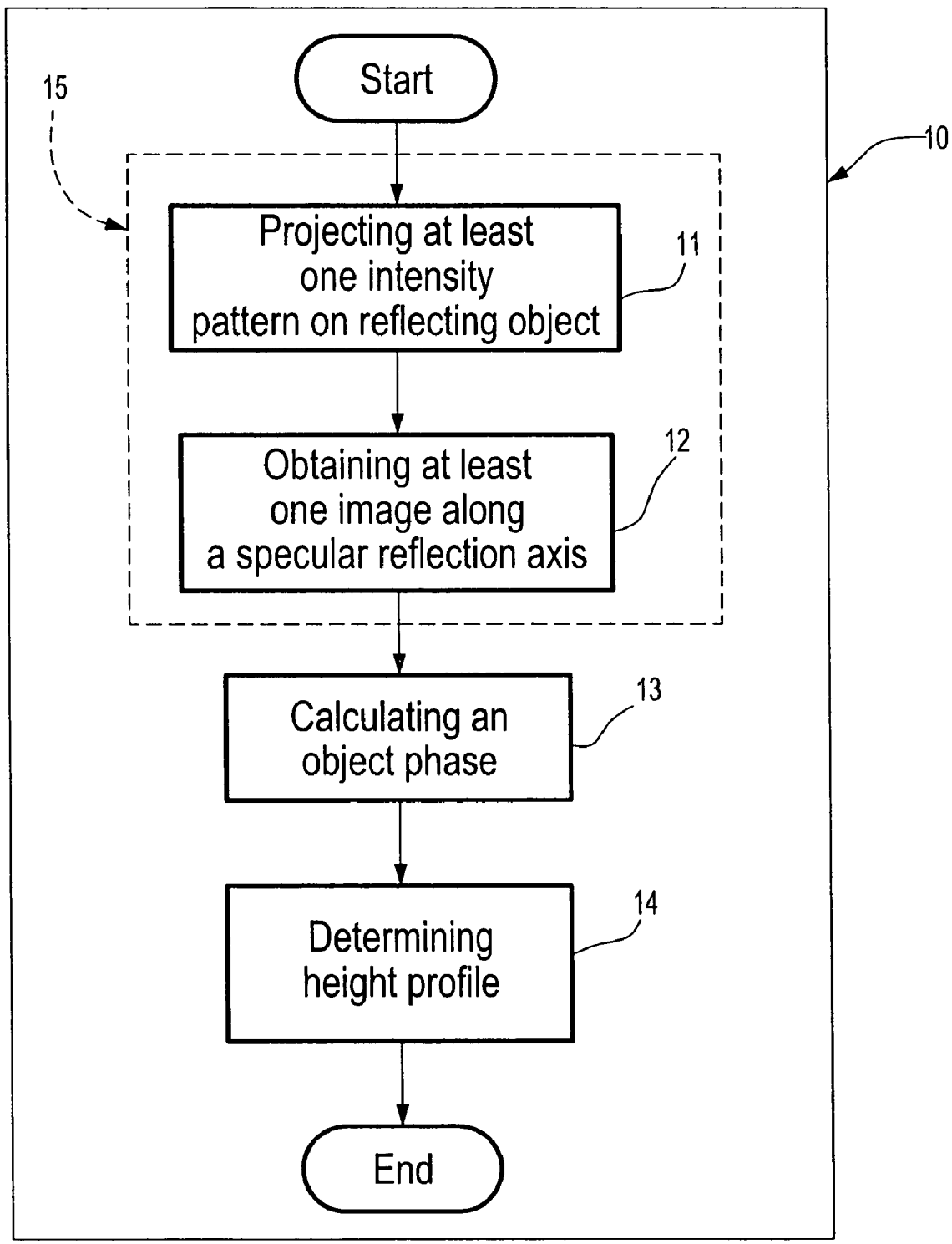
FIG. 3 is a flow chart of a method to determine a height profile of a reflecting object in accordance with an embodiment of the present invention.

According to an embodiment of the present invention, a method 10 of determining a height profile of a substantially reflecting object, as illustrated in FIG. 3, will be described. At least one intensity pattern is projected on the object (step 11) and at least one image is acquired along a specular reflection axis 42 (step 12). Then an object phase map, $\phi_{object}(x'.y')$, is determined at step 13 using the acquired images at step 12. By comparing the object phase map $\phi_{object}(x',y')$ to a reference phase map $\phi_{ref}(x',y')$ corresponding to a reference surface, the height profile of the object is determined at step 14.

The height profile can be a measurement of the height at one or several points of the object surface, it can be a measurement along a cross-section line of the object, or it can correspond to a map of the entire object thickness.

Figure 4A:
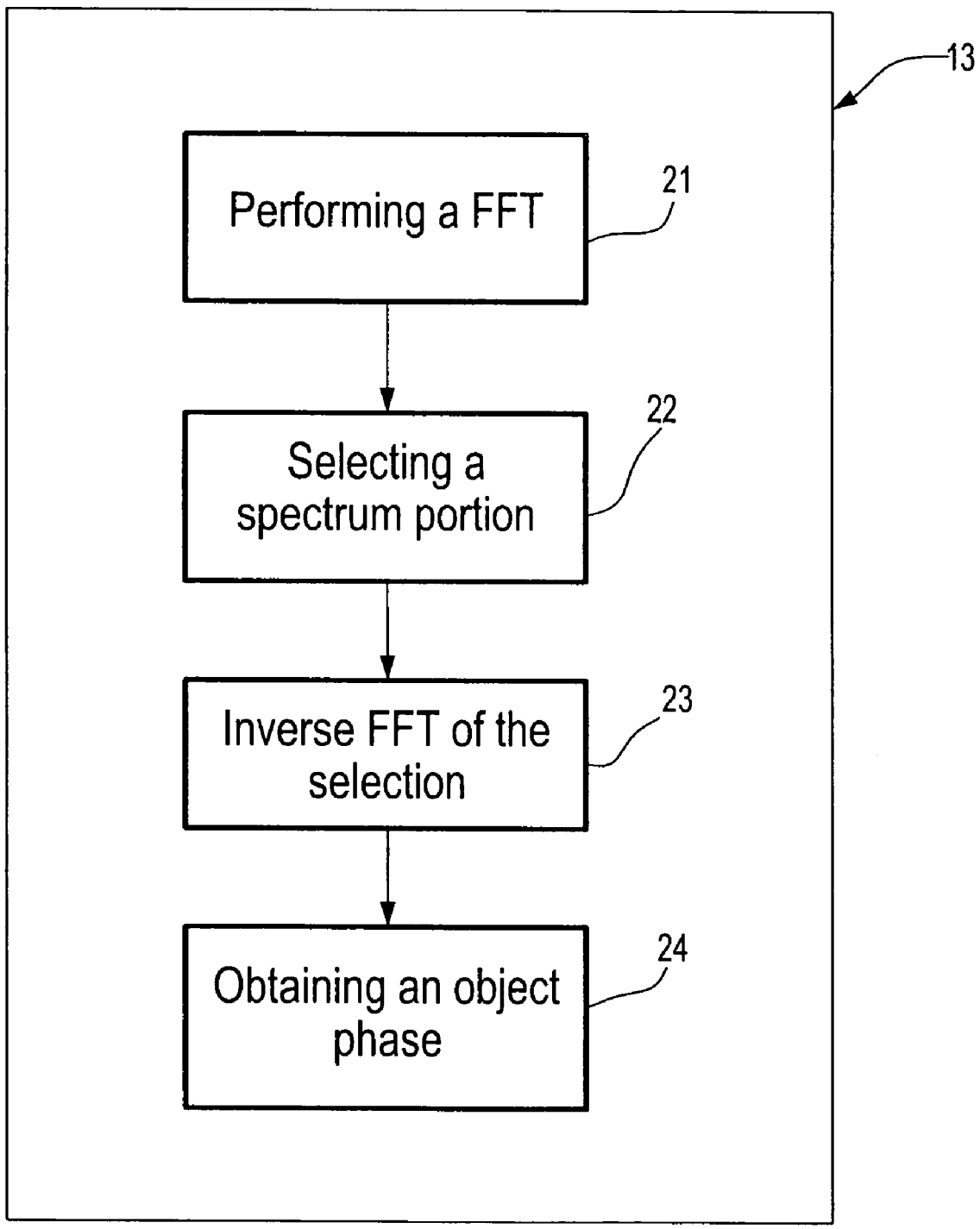
FIG. 4A is a flowchart of step 13 of the method of FIG. 3 in accordance with an embodiment of the present invention.
Figure 4B:
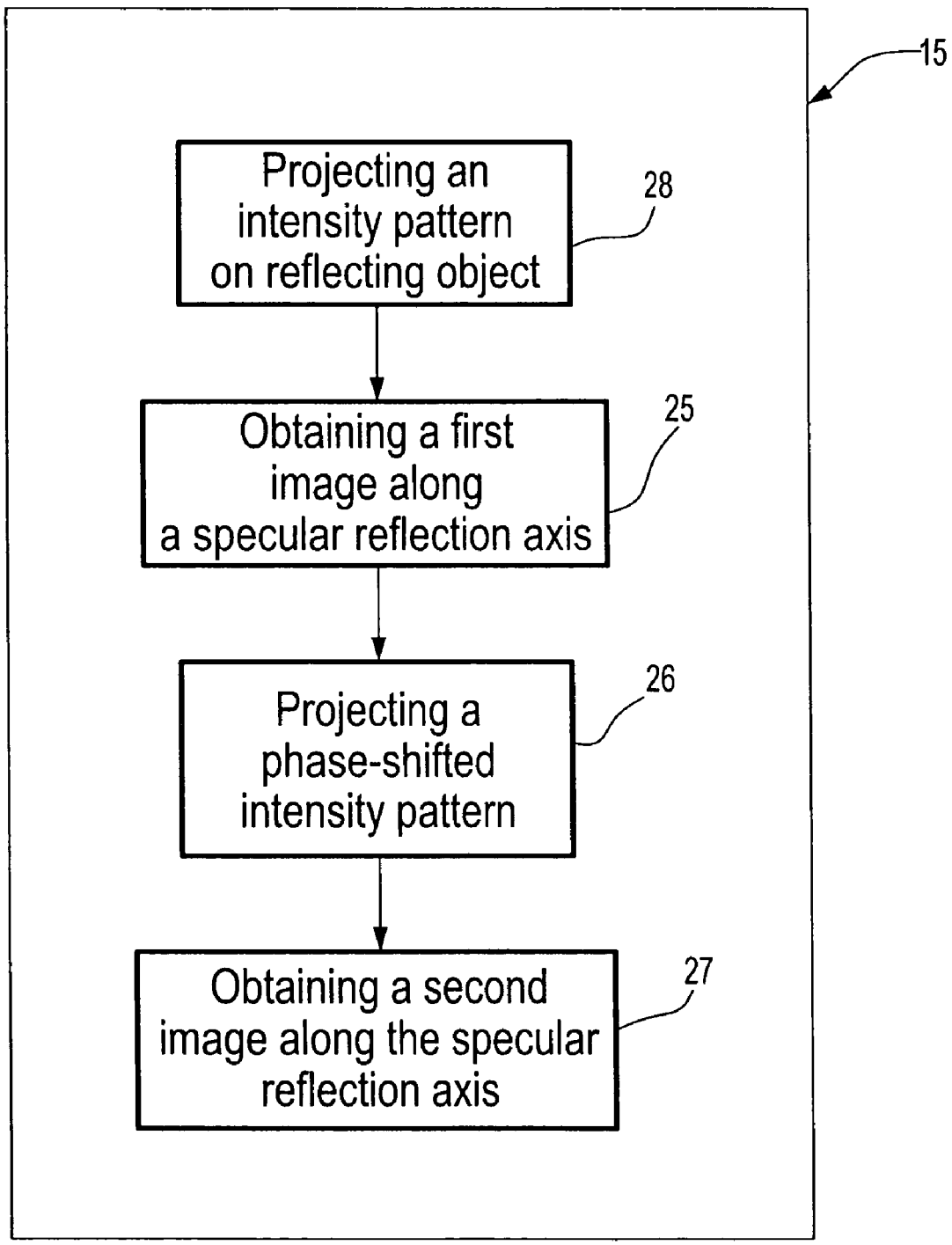
FIG. 4B is a flowchart of step 15 of the method of FIG. 3 in accordance with another embodiment of the present invention.

FIG. 4B describes in more detail steps 11 and 12 when a phase-stepping method with only two phase-shifted patterns projections are used to determine the object phase map $\phi_{object}$ (x',y'). A first image (step 25), corresponding to a first intensity pattern projection (step 28), is obtained along the specular reflection axis 42, then the intensity pattern is phase-shifted (step 26) before a second image is obtained (step 27) along the specular reflection axis 42.

FIG. 4A describes in more detail how to determined the object phase map (step 13) when an FFT method is used. In step 21, an FFT is performed using the intensity values of an image acquired in step 12. This provides a spectrum from which a portion is selected (step 22). Then an inverse FFT is performed on the selected portion of the spectrum (step 23). This provides imaginary and real components from which the object phase map $\phi_{object}$(x',y') is established (step 24).

Figure 2B:
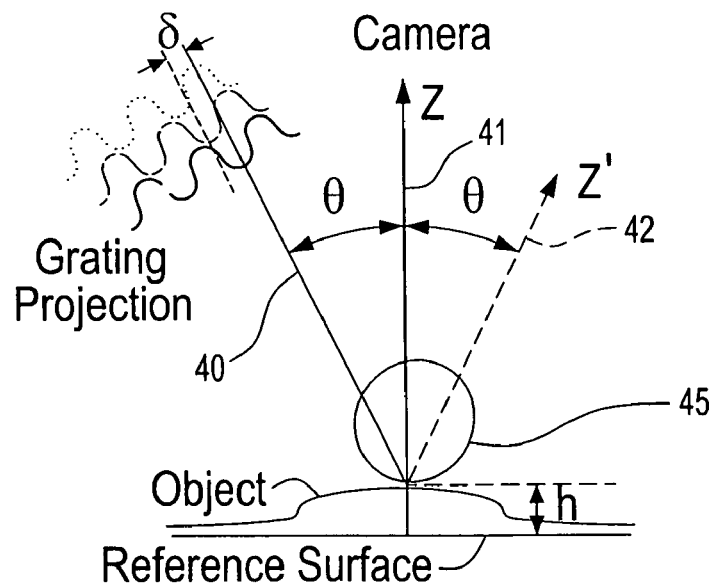
FIG. 2B is a schematic view of the system of FIG. 2A when used to measure a height profile of a diffusing object.
Figure 5A:
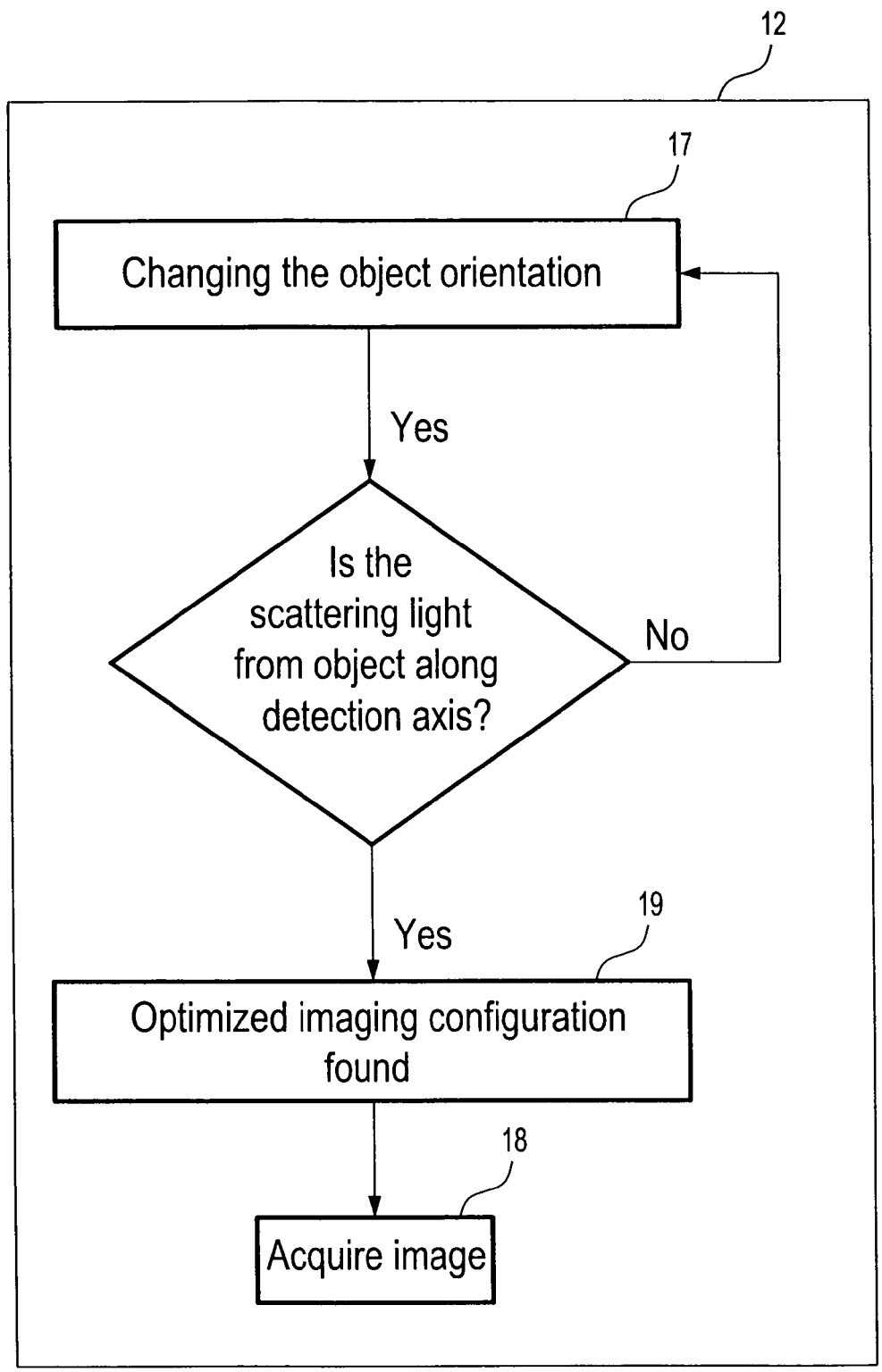
FIG. 5A is a flowchart of step 12 of the method of FIG. 3 which determines an optimized imaging configuration of a reflecting object, in accordance with an embodiment of the present invention.
Figure 5B:
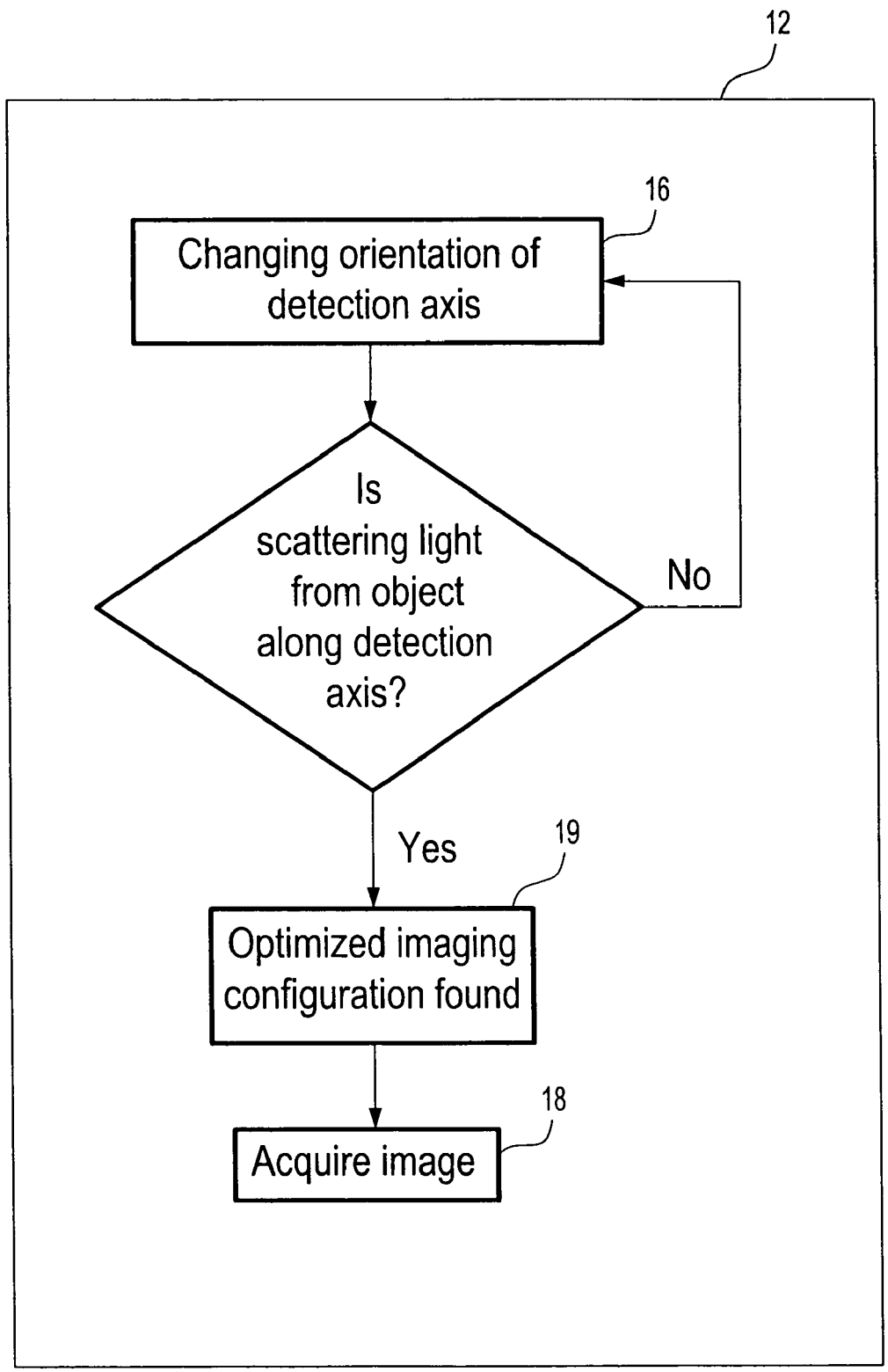
FIG. 5B is a flowchart of step 12 of the method of FIG. 3 which determines an optimized imaging configuration of a reflecting object, in accordance with another embodiment of the present invention.

It may be found that, during the inspection of an object, that some regions of the object are quite diffusing whereas other regions are quite reflecting. Or, it may happen that from object to object, some of them are more diffusing than others. In such case, it is very useful to be able to adjust the relative orientation of the detection axis with respect to the object orientation. This particular embodiment of the present invention is described in FIG. 5A and in FIG. 5B, where the step 12 of obtaining an image of the method 10 comprises the intermediate step of finding an optimized imaging configuration 19 that is more appropriate to the surface characteristics of the object prior to acquiring the image (step 18). In FIG. 5A, the optimized imaging configuration 19 is found by changing the object orientation 17 until the scattered light by the object is directed in majority along the detection axis whereas in FIG. 5B, the detection axis orientation is scanned 16 to find the optimized object orientation 19. In the case of reflective surface region, that optimized imaging configuration would thus correspond to FIG. 2A, where the detections axis coincide with the specular reflection axis 42. Conversely, when the surface region is mostly diffusing, the optimization of the imaging configuration should lead to the configuration resembling the illustration of FIG. 2B where the majority of scattered light is directed along a non-specular detection axis 41 instead of being directed along the specular axis 42. It is envisaged that a simple way of changing the object orientation 17 would be to rotate the object about an axis (not shown).

Finding an optimized imaging configuration 19 can be implemented by using many criteria. As described above, the criteria may be to optimize the detected signal by the camera. Or, the criteria may be based on getting a non-saturated detected signal. It will be obvious for someone skilled in the art that any suitable criteria may be used and adapted to a particular experimental situation.

Figure 6:
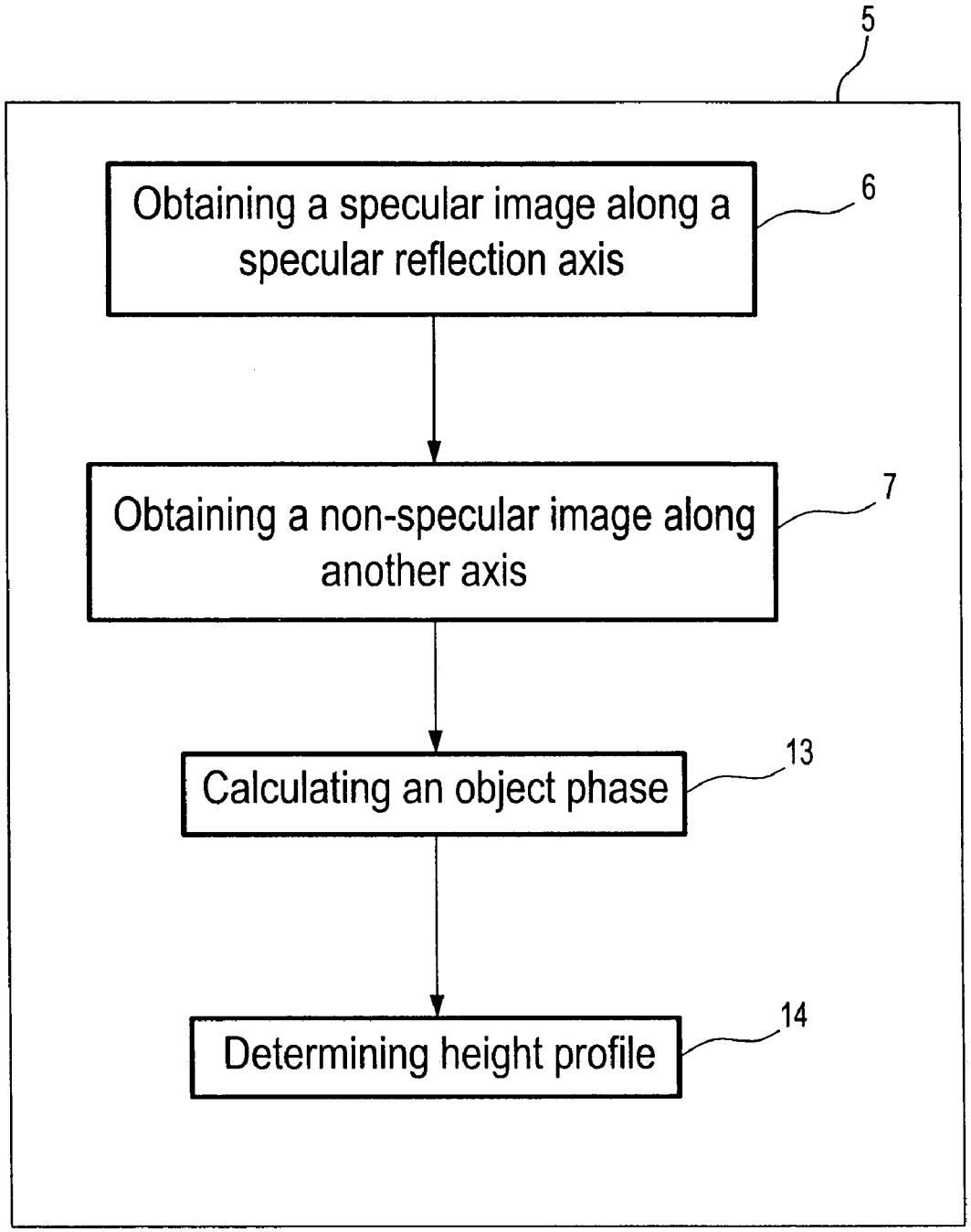
FIG. 6 is a flow chart of a method to determine a height profile of a reflecting object in accordance with another embodiment of the present invention.

In one embodiment of the present invention, detection along both a specular reflection axis 42 and along a non specular detection axis 41 is provided in order to take advantage of both configurations. This method 5 is described in FIG. 6. A specular image is obtained along a specular reflection axis 42 (step 6), then a non-specular image is obtained along a another axis (step 7). Then, steps 13 and 14 already described in method 10 follow to provide the object height profile. Calculating an object phase 13 can be performed by merging the specular and non-specular images in a global image from which the object phase is established. Or, it may also be performed by establishing a first phase using the specular image and establishing a second phase using the non-specular image and then merging the first and second phases to provide the object phase. Naturally, other combinations of the specular and non specular images can be envisaged and are encompassed by the present invention, including the possibility of using only one of these images. Also, corresponding coordinates for each type of image (specular and non-specular) can be determined and then used to find the best algorithm for calculating the height profile. It is also possible to first determine the height profile using each type of image separately (specular and non-specular) and then merge the first determined heights to obtain the height profile.

Figure 7:
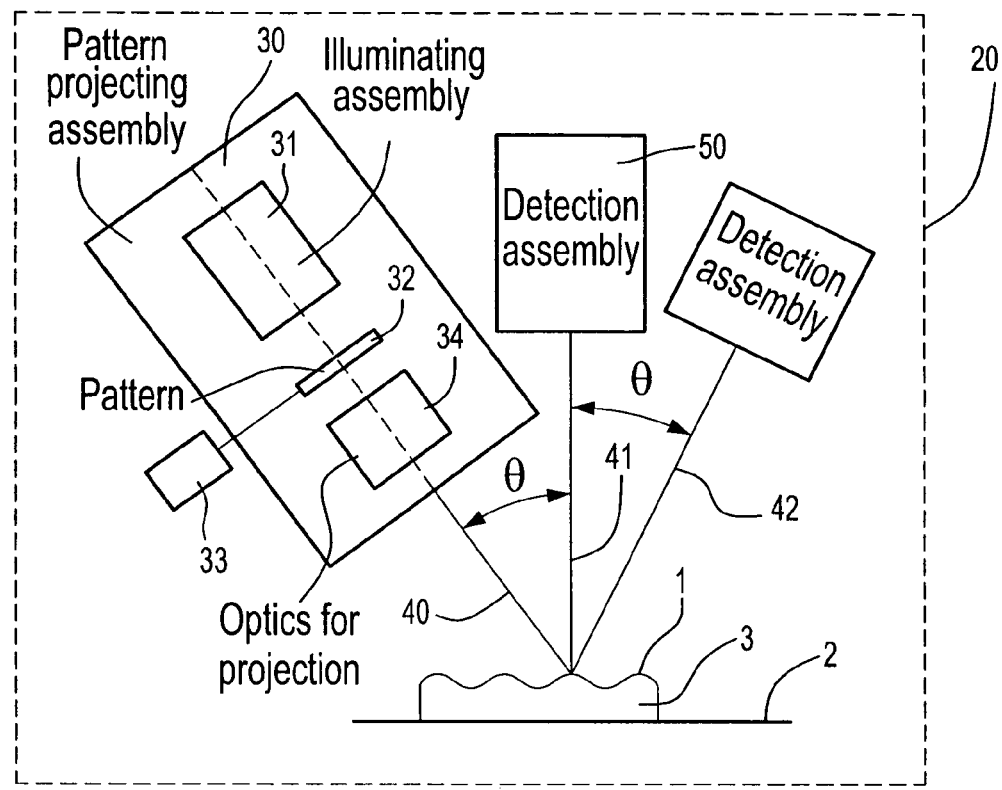
FIG. 7 is a schematic view of a system for determining the height profile of an object according to an embodiment of the present invention.
Figure 8:
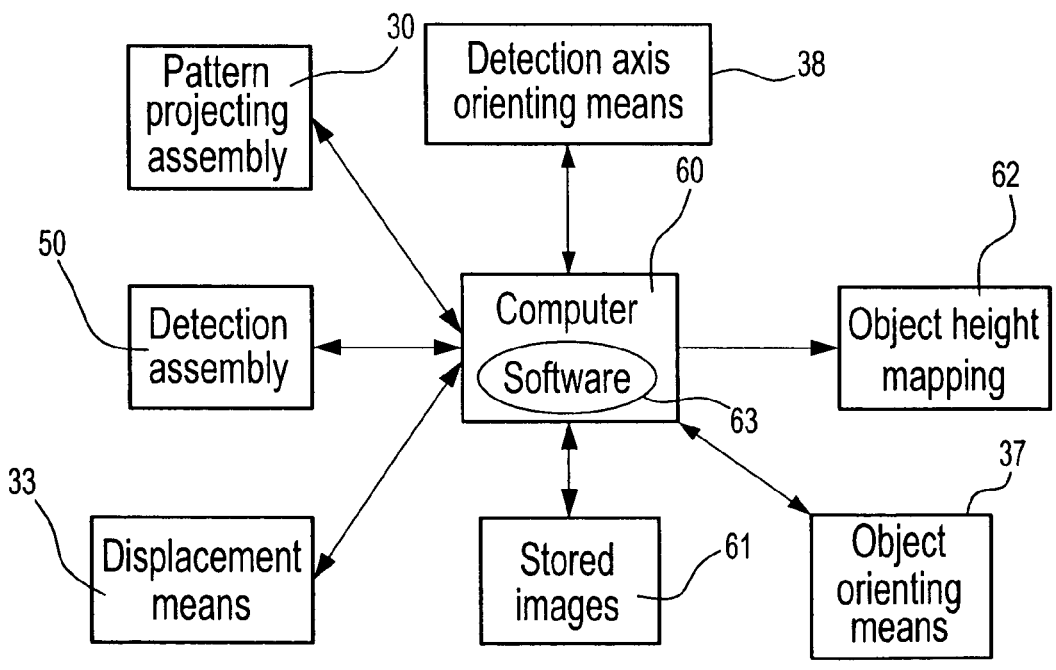
FIG. 8 is a block diagram describing the relations between the system components and a computer according to an embodiment of the present invention.

Turning now to FIGS. 7 and 8, a system 20 for determining a height profile of a substantially reflecting object 3 with respect to a reference surface 2, according to an embodiment of the present invention, is shown. In FIG. 7, a pattern projection assembly 30 is used to project onto the surface 1 of the object 3, an intensity pattern. A single detection assembly 50 can be used to acquire images of the object. In this embodiment, two detection assemblies 50 are shown, one to acquire an specular image of the object 3 along the specular reflection axis 42 and one to acquire an non-specular image of the object 3 along a non-specular detection axis 41. The detection assembly 50 can comprise a CCD camera or any other detection device. The detection assembly 50 can also comprise the necessary optical components known to those skilled in the art to relay appropriately the projected intensity pattern on the object to the detection device. The pattern projection assembly 30 is projecting the intensity pattern along a projection axis that makes an angle $\theta$ with respect to the normal of the surface of the object 3. The pattern projection assembly can comprise, for example, an illuminating assembly 31, a pattern 32, and optics for projection 34. The pattern 32 is illuminated by the illuminating assembly 31 and projected onto the object 3 by means of the optics for projection 34. The pattern can be a grid having a selected pitch value, p. Persons skilled in the art will appreciate that other kinds of patterns, such as binary patterns, may also be used. The characteristics of the intensity pattern can be adjusted by tuning both the illuminating assembly 31 and the optics for projection 34. The pattern displacement means 33 is used to shift, in a controlled manner, the pattern relatively to the object 3. The displacement can be provided by a mechanical device or could also be performed optically by translating the pattern intensity. In another example, the displacement is produced by electrically controlling a lighting pattern. This displacement can be controlled by a computer 60 (FIG. 8). Variant means for shifting the pattern relative to the object include displacement of the object 3 and displacement of the pattern projection assembly 30.

The system 20 also allows to optimize the orientation of the object with respect to the detection axis 41 by means of either an object orienting means 37 or a detection axis orienting means 38.

As illustrated in FIG. 8, a computer 60 is provided to control the detections axis orienting means 38 and the object orienting means 37. The computer 60 can also control the alignment and magnification power of the pattern projection assembly 30 and the alignment of the detection assembly 50. Computer 60 can also control displacement means 33. Naturally, the computer 60 is used to compute the object height mapping 62 from the data acquired by the detection assembly 50. The computer 60 is also used to store acquired images and corresponding phase values 61, and manage them. Software 63 can act as an interface between the computer and the user to add flexibility in the system operation.

Software 63 comprises the necessary algorithms to extract, from the acquired images, the object phase. If this information is extracted by using a FFT processing of the images, then software 63 will include a processing module comprising a FFT algorithm to perform a FFT on an image an provide a spectrum, a selection algorithm to select automatically a portion of the spectrum, an inverse FFT algorithm to perform an inverse FFT on the selected portion of the spectrum, and an algorithm to extract, from the imaginary and real components resulting from the inverse FFT, the phase map.

The above-described method 10 and system 20 can be used to determine the height profile of a totally reflecting object or partly reflecting object. They may also be used for detecting defects on an object in comparison with a similar reflecting object used as a model or to detect changes of the object surface with time. In all cases, the above-described method 10 and system 20 can further include the selection of an appropriate intensity pattern and of an appropriate acquisition resolution that will be in accordance with the height of the object to be measured.

The above-described method 10 can naturally be applied in discrete steps in order to perform the object height profile measurement layer by layer. This technique—also called image unwrapping—enables one to measure the net reflecting object height while keeping a good image resolution.

As mentioned earlier, the present method 10 and system 20 can be used to determine the height profile of substantially reflecting objects of different natures, such as, for example, an object with a reflective metallic coating.

The above-described method 10 and system 20 can also be used to determine the shape and the volume of an object or of a portion of an object, since this method provides information, not only about the height of the object, but also about its length and width. This method can be advantageously applied, for example, in the semiconductor industry.

All the above presented applications of the invention can be used to further assess the quality of a coated object under inspection.

Although the present invention has been described hereinabove by way of specific embodiments thereof, it can be modified, without departing from the spirit and nature of the subject invention as defined herein. The scope of the invention if therefore intended to be limited solely by the scope of the appended claims.

We claim:

1. A method for determining a height profile of an object with respect to a reference surface, the method comprising:
   placing the object on the reference surface;
   projecting at least one intensity pattern along a projection axis having an angle $\theta \neq 0$ from a normal axis of the reference surface and the object;
   detecting an image of the object along a specular reflection axis, wherein said specular reflection axis corresponds to a direction along which a portion of said intensity pattern is specularly reflected by said object;
   determining an object phase map using said image; and
   determining said height profile using said object phase map and a predetermined reference phase map corresponding to the reference surface.

2. The method as claimed in claim 1, wherein said intensity pattern comprises a sinusoidal pattern.

3. The method as claimed in claim 1, wherein said intensity pattern comprises visible light intensity.

4. The method as claimed in claim 1, wherein determining an object phase map comprises:
   performing a Fast Fourier Transform (FFT) of said image for providing a spectrum;
   performing an inverse FFT of a selected portion of said spectrum for providing imaginary and real components; and
   obtaining the object phase map using said imaginary and real components.

5. The method as claimed in claim 1, further comprising:
   obtaining at least a second image of the object along said specular reflection axis, wherein said second image corresponds to a second intensity pattern projected on said object; and
   wherein said object phase map is calculated further using said second image.

6. The method as claimed in claim 5, wherein said intensity patterns comprise intensity patterns that are phase-shifted with respect to each other.

7. The method as claimed in claim 5, wherein said intensity patterns comprise intensity patterns that have different spectral bandwidths.

8. The method as claimed in claim 1, further comprising evaluating a shape of a feature of said relief.

9. The method as claimed in claim 8, further comprising evaluating a volume of said feature of said relief.

10. The method as claimed in claim 1, further comprising a step of:
    optimizing at least one of an orientation of the object, with respect to the projection axis and a detection axis, and an orientation of the detection axis, with respect to said object, to provide an optimized imaging configuration;
    wherein said optimized imaging configuration corresponds, in the case where a surface of the object is substantially reflecting, to a configuration that provides along the detection axis a specular reflection, by said surface, of at least a portion of the projected intensity pattern and wherein said optimized configuration corresponds, in the case where the surface of the object is substantially diffusing, to a configuration that does not provide along the detection axis a specular reflection by said surface of a portion of the projected intensity pattern.

11. The method of claim 10, wherein said optimizing comprises scanning said orientation of at least one of said object and said detection axis, until finding the optimized configuration.

12. The method of claim 10, wherein said optimizing comprises choosing between a first and a second imaging configuration, wherein the first imaging configuration provides along the detection axis said specular reflection by said surface of said at least a portion of the projected intensity pattern and wherein the second imaging configuration does not provide along the detection axis said specular reflection by said surface of said portion of the projected intensity pattern.

13. The method of claim 10, wherein said optimizing comprises setting the orientation of the detection axis with respect to the projection axis and the object orientation with respect to both axis to said optimized imaging configuration, by using previous knowledge about an optical property of said object.

14. The method of claim 10, further comprising performing said optimization automatically.

15. A method for determining a height profile of an object with respect to a reference surface, the method comprising:
    placing the object on the reference surface:
    projecting at least one intensity pattern along a projection axis having an angle $\theta \neq 0$ from a normal axis of the reference surface and the object;
    detecting a specular image of the object along a specular reflection axis, wherein said specular reflection axis corresponds to a direction along which a portion of said intensity pattern is specularly reflected by said object;
    detecting a non-specular image of the object along a detection axis that is oriented differently from said specular reflection axis, wherein said non-specular image corresponds to said intensity pattern projected on the object along said projection axis; and determining an object phase map using at least one of a portion of said specular image, a portion of said non-specular image, and an image associated to the reference surface; and determining said height profile using said object phase map and a predetermined reference phase map associated to the reference surface.

16. The method as claimed in claim 15, wherein said intensity pattern comprises a sinusoidal pattern.

17. The method as claimed in claim 15, wherein said intensity pattern comprises visible light intensity.

18. The method as claimed in claim 15, wherein said determining an object phase map comprises merging said specular and non-specular images in a global image from which said object phase map is established.

19. The method as claimed in claim 15, wherein said determining an object phase map comprises establishing a first phase using said specular image and establishing a second phase using said non-specular image and merging said first and second phases to provide said object phase map.

20. The method as claimed in claim 15, wherein determining an object phase map comprises:
performing a Fast Fourier Transform (FFT) of at least one of a portion of said specular image and a portion of said non-specular image or combination of said portions for providing a spectrum;
performing an inverse FFT of a selected portion of said spectrum for providing imaginary and real components; and
obtaining the object phase map using said imaginary and real components.

21. The method as claimed in claim 15, further comprising:
obtaining, at least a second specular image of the object along said specular reflection axis, wherein said second specular image corresponds to a second intensity pattern projected on said object;
obtaining, at least a second non-specular image of the object along said detection axis that is oriented differently from said specular reflection, wherein said second non-specular image corresponds to said second intensity pattern projected on said object; and
wherein said object phase map is determined further using at least one of a portion of said second specular image and a portion of said second non-specular image.

22. The method as claimed in claim 20, wherein said intensity patterns comprise intensity patterns that are phase-shifted with respect to each other.

23. The method as claimed in claim 20, wherein said intensity patterns comprise intensity patterns that have different spectral bandwidths.

24. The method as claimed in claim 15, further comprising evaluating a shape of a feature of said relief.

25. The method as claimed in claim 24, further comprising evaluating a volume of said feature of said relief.

26. The method as claimed in claim 15, further comprising:
obtaining coordinates of said object that correspond in each of said specular and non-specular images; and
using said corresponding coordinates to select an algorithm used for said determining said height profile.

27. The method as claimed in claim 15, wherein said determining said height profile comprises using an object phase for each type of said specular and said non-specular images separately to obtain a specular and a non-specular height profiles and then merging said specular and said non-specular height profiles to obtain said height profile.

28. A system for determining a height profile of an object, the system comprising:
a reference surface having an associated image and associated phase map;
a pattern projection assembly for projecting along a projecting axis having an angle $\theta \neq 0$ from a normal axis of the reference surface and the object, an intensity pattern on the object;
a detection assembly for obtaining along a detection axis at least one image of the object, wherein said detection axis corresponds to a direction along which a portion of said intensity pattern is specularly reflected by said object; and
a processor for establishing a phase of the object using said at least one image and for determining the height profile of said object using said object phase and the reference phase map.

29. The system as claimed in claim 28, wherein said pattern projection assembly comprises an illuminating assembly, a pattern, and optical elements for providing said intensity pattern.

30. The system as claimed in claim 29, wherein said detection assembly comprises a detection device and optical devices for acquiring said image characterizing said object.

31. The system as claimed in claim 30, wherein said detection assembly comprises a CCD camera.

32. The system as claimed in claim 30, further comprising an object orienting means for optimizing said object orientation with respect to the projection axis and the detection axis.

33. The system as claimed in claim 30, further comprising a detection axis orienting means for optimizing said detection axis orientation with respect to the projection axis.

34. The system as claimed in claim 30, further comprising a second detection assembly for obtaining along a different axis than the detection axis at least one image of the object.

35. The system as claimed in claim 30, wherein said processor comprises a Fast Fourier Transform software for establishing the object phase.

36. The system as claimed in claim 30, wherein:
said pattern projection assembly comprises an assembly for simultaneously projecting at least two-phase-shifted intensity patterns on the object, each of the projected patterns being characterized by a predetermined bandwidth; and wherein
said detection assembly comprises an image acquisition apparatus sensitive to said predetermined bandwidths for simultaneously taking an image of each projected patterns on the object.

37. The system as claimed in claim 30, further comprising displacement means for positioning, at selected positions, said intensity pattern relative to said object.

38. The system as claimed in claim 37, wherein said processor further comprises a controller to control one of at least one projection assembly, the detection assembly and the displacement means.

39. The system as claimed in claim 38, wherein said controlling comprises controlling said displacement means such that a first image is obtained at a first projection of the intensity pattern and the second image is obtained at a second projection of the intensity pattern, said second projection being phase-shifted relative to the first projection.

* * * * *